United States Patent [19]

Ogino

[11] 4,192,577
[45] Mar. 11, 1980

[54] ZOOM LENS SYSTEM

[75] Inventor: Shuji Ogino, Osaka, Japan

[73] Assignee: Minolta Camera Kabushiki Kaisha, Osaka, Japan

[21] Appl. No.: 873,796

[22] Filed: Jan. 31, 1978

[30] Foreign Application Priority Data

Feb. 4, 1977 [JP] Japan .................. 52-12007

[51] Int. Cl.² ............................................. G02B 15/14
[52] U.S. Cl. ................................................... 350/184
[58] Field of Search ...................... 350/184, 186, 176

[56] References Cited

U.S. PATENT DOCUMENTS

| | | | |
|---|---|---|---|
| 3,160,699 | 12/1964 | Yamaji | 350/184 |
| 3,377,119 | 4/1968 | Takano | 350/184 |
| 3,523,719 | 8/1970 | Back | 350/184 |
| 4,087,160 | 5/1978 | Besenmatter et al. | 350/184 |

FOREIGN PATENT DOCUMENTS

1229941 4/1971 United Kingdom ............... 350/184

*Primary Examiner*—Paul A. Sacher
*Attorney, Agent, or Firm*—Jackson, Jones & Price

[57] ABSTRACT

A zoom lens system consisting, from the object to the image side, of a positive front focusing lens group, a negative variator lens group, a negative compensator lens group and a relay lens group is provided. The variator lens group has three single lens elements, in which a negative meniscus shaped air space is formed between the second and third single lens elements. The relay lens group is divided into first and second sub-groups with a relatively wide air space formed therebetween, each of the first and second sub-groups has a pair of separate lens elements.

14 Claims, 40 Drawing Figures

Spherical Aberration

FIG.6b

Astigmatism

FIG.6c

Distortion

FIG.7a

Spherical Aberration

FIG.7b

Astigmatism

FIG.7c

Distortion

FIG.8a
Spherical Aberration

FIG.8b
Astigmatism

FIG.8c
Distortion

FIG.9a
Spherical Aberration

FIG.9b
Astigmatism

FIG.9c
Distortion

FIG.10a
Spherical Aberration

FIG.10b
Astigmatism

FIG.10c
Distortion

FIG.11a

Spherical Aberration

FIG.11b

Astigmatism

FIG.11c

Distortion

FIG.12a

Spherical Aberration

FIG.12b

Astigmatism

FIG.12c

Distortion

FIG.13a

Spherical Aberration

FIG.13b

Astigmatism

FIG.13c

Distortion

FIG.14a

Spherical Aberration

FIG.14b

Astigmatism

FIG.14c

Distortion

FIG.15a

Spherical Aberration

FIG.15b

Astigmatism

FIG.15c

Distortion

FIG.16a

Spherical Aberration

FIG.16b

Astigmatism

FIG.16c

Distortion

ZOOM LENS SYSTEM

BACKGROUND OF THE INVENTION

1. Field of the Invention

The present invention relates to a zoom lens system for use in cameras such as 35 mm single lens reflex cameras and so-called 110 size compact cameras, and more particularly to a zoom lens system having a front lens group, a variator lens group, a compensator lens group and a relay lens group.

In the above mentioned zoom lens system, the diameter of the system and the total length of the system relative to the focal length are generally increased in accordance with the increase of the field angle.

2. Description of the Prior Art

In this field, various forms of zoom lens systems have been suggested in the prior art such as disclosed in U.S. Pat. Nos. 3,584,935, 3,796,481, 3,840,290, 3,975,089 and Japanese Pat. Publication No. 51-26276.

The Japanese Patent Publication is of particular interest in that it discloses a type of varifocal lens system consisting of a front lens group of a positive refractive power, a variator lens group of a negative refractive power, and a compensator lens group of a negative refractive power, in which the variator lens group has three single lens elements. However, the image side surface of the second single lens element and the object side surface of the third single lens element in the variator lens group have almost the same radius of curvature. Further, the relay lens group of the Japanese Patent Publication consists of five separate lens elements, which are a first positive single lens element, a second positive single lens element, a considerably thick positive doublet element having a rear surface of a relatively short radius of curvature, a third positive single lens element and a negative single lens element from the object to the image side without any relatively wide air space formed between the separate elements.

SUMMARY OF THE INVENTION

It is an object of the present invention to provide a zoom lens system having a wide zooming range from telephoto to a relatively wide angle setting in a compact size.

Another object of the present invention is to provide a zoom lens system having an excellent correction of aberrations across the entire zooming range.

The present invention provides a zoom lens system having a positive front lens group, a negative variator lens group, a negative compensator lens group and a relay lens group from the object to the image side. The front lens group consists of a positive single lens element and a positive doublet element. The variator lens group consists of a first negative single lens element, a second negative single lens element at the image side of the first negative single lens element and a positive single lens element at the image side of the second negative single lens element, in which the image side surface of the second negative single lens element and the object side surface of the positive single lens element form an air space of a negative meniscus shape therebetween defined by the following condition formula:

$$0.1 < |f_2| \cdot (1/r_b - 1/r_a) < 1.0.$$

The compensator lens group consists of one lens element. Finally, the relay lens group has a first sub-group and a second sub-group at the image side of the first sub-group, the first sub-group following the compensator lens group, without any lens element interposed, consist of a positive single lens element and a positive doublet element, while the rear sub-group consist of a positive lens element and a negative single lens element at the image side of the positive lens element. In the relay lens group, the first sub-group and the second sub-group form a relatively wide air space therebetween defined by the following condition formula:

$$1.3 f_m > d_m > 0.25 f_m.$$

The features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENT

The following description is provided to enable any person skilled in the optical and camera field to make and use the invention and sets forth the best modes contemplated by the inventor of carrying out his invention. Various modifications, however, will remain readily apparent to those skilled in the arts since the generic principles of the present invention have been defined herein specifically to provide a relatively economical and easily manufactured zoom lens system.

As can be seen in each of the embodiments disclosed in FIGS. 1 to 4, zoom lens system of the present invention comprises: a front lens group $V_1$ of a positive refractive power consisting of a positive single lens element and a positive doublet element formed by cementing negative and positive sub-elements; a variator lens group $V_2$ of a negative refractive power consisting of a first negative single lens element $G_4$, a second negative single lens element $G_5$ at the image side of the first negative single lens element and a positive single lens element $G_6$ at the image side of the second negative single lens element; a compensator lens group $V_3$ of a negative refractive power consisting of one lens element; and a relay lens group R having a first sub-group $R_1$ and a second sub-group $R_2$ at the image side of the first sub-group, the first sub-group $R_1$ following the compensator lens group $V_3$ without any lens element interposed, consist of a positive single lens element and a positive doublet element, while the rear subgroup $R_2$ consist of a positive lens element and a negative single lens element at the image side of the positive lens element.

According to the present invention, the front lens group $V_1$ fulfills the following condition formulae:

(1) $0.4 > n_a - n_b > 0.05$,
(2) $3.0 > n_b + n_c > 3.5$, and
(3) $\nu_a < 40$, $\nu_b + \nu_c > 80$, wherein $n_a$ and $\nu_a$ represent the refractive index and the Abbe number, with respect to d-line, of the negative sub-element of the positive doublet element in the front lens group, respectively; $n_b$ and $\nu_b$ represent the refractive index and the Abbe number, with respect to d-line, of the positive sub-element of the positive doublet element in the front lens group, respectively; and $n_c$ and $\nu_c$ represent the refractive index and the Abbe number, with respect to d-line, of the positive single lens element in the front lens group, respectively. The variator lens group $V_2$ fulfils the following condition formulae:

(4) $f_s > |f_2| > 0.5 f_s$, and
(5) $0.1 < |f_2| \cdot (1/r_b - 1/r_a) < 1.0$, wherein $f_s$ represents the focal length of the whole zoom lens system at the shortest focal length setting; $f_2$ represents the focal length of the variator lens group $V_2$; $r_a$ represents the radius of curvature of the image side surface of the second negative single lens element $G_5$ in the variator lens group; and $r_b$ represents the radius of curvature of the object side surface of the positive single lens element $G_6$ in the variator lens group. Finally, the relay lens group R fulfils the following condition formulae:

(6) $1.3 f_m > d_m > 0.25 f_m$,
(7) $5.0 > r_c/r_d > 1.3$,
(8) $\nu_l - \nu_m < 30$, and
(9) $|r_e| > 2.5 f_m$, wherein $f_m$ represents the focal length of the relay lens group R; $d_m$ represents the distance between the first and second sub-groups $R_1$ and $R_2$ of the relay lens group R; $r_c$ represents the radius of curvature of the image side surface of the positive lens element of the second sub-group $R_2$ in the relay lens group R; $r_d$ represents the radius of curvature of the object side surface of the negative single lens element of the second sub-group $R_2$ in the relay lens group R; $\nu_l$ represents the Abbe number of the positive lens element of the second sub-group $R_2$ in the relay lens group R; and $\nu_m$ represents the Abbe number of the negative single lens element of the second sub-group $R_2$ in the relay lens group R; and $r_e$ represents the radius of curvature of the rear surface of the positive doublet element of the first sub-group $R_1$ in the relay lens group R.

The above condition formula (1) defines a condition for minimizing the variations in various aberrations during zooming. When the value of $n_a - n_b$ increases beyond the upper limit of condition formula (1), the negative refractive power of the cemented surface within the positive doublet element of the front lens group $V_1$ tends to become greater, and even if the aberrations could be balanced within the front lens group $V_1$, it becomes increasingly difficult to obtain balances with the aberrations generated in the subsequent lens groups $V_2$, $V_3$ and R. Conversely, when $n_a - n_b$ is decreased beyond the lower limit of the above condition formula (1), the variations in spherical aberration, astigmatism, etc. tend to become greater beyond the tolerable limits.

The condition formula (2) defines a condition that must be satisfied for minimizing the variation in aberrations during a zooming operation and for keeping the diameter of the front lens group $V_1$ within a useful compactness, while permitting selection of costwise advantageous lens glass materials for the front lens group $V_1$. Thus, if the value of $n_b + n_c$ decreases beyond the lower limit of condition formula (2), aberration compensations could be feasible but, for the purpose of maintaining the overall refractive power of the front lens group $V_1$ at a predetermined value, it becomes necessary that the radii of curvature of the refractive surfaces of positive powers in the front lens group $V_1$ be decreased. Therefore, to obtain desired marginal thickness of lens elements, the lens elements must be of greater axial thickness and, hence, to maintain a necessary quantity of light in off-axial pencils, the diameter of the lens element nearest the object must be increased. Conversely, when $n_b + n_c$ increases beyond the upper limit of condition formula (2), the selection of lens glass materials for the front lens group $V_1$ becomes more and more limited and, therefore, correction of chromatic aberration becomes difficult. This trend, coupled with the trend mentioned in connection with condition formula (1), makes it inevitable to select costly glass materials.

The function of condition formulae (3) is to minimize the variation of chromatic aberration during the zooming operation. When $\nu_a$, $\nu_b$ and $\nu_c$ are selected outside of the condition formulae (3), the correction of chromatic aberration in the longest focal length setting becomes considerably difficult.

The condition formula (4) is a condition for reducing the variations in various aberrations due to zooming and keeping the entire lens system compact. When $|f_2|$ becomes greater beyond the upper limit of condition formula (4), the aberrations could be corrected but the amount of shift of the variator lens group $V_2$ must be increased to obtain a desired zoom ratio and, consequently, the lens diameter of the front lens group $V_1$, as well as the overall lens length, must be increased. As $|f_2|$ becomes smaller beyond the lower limit of condition formula (4), the variation in spherical aberration due to zooming tends to be increased and, particularly in the longest focal length setting, the spherical aberration related to higher order of aberration coefficients is generated to a significant extent.

The condition formula (5) defines a condition for reducing the variation in spherical aberration due to zooming. When $|f_2| \cdot (1/r_b - 1/r_a)$ becomes smaller beyond the lower limit of condition formula (5), an excessive correction of spherical aberration tends to take place in the longest focal length setting. It may be possible to remedy this excessive correction of the spherical aberration by means of increasing the air space before the positive single lens element $G_6$ in the variator lens group $V_2$, but this is in conflict with the concept of making the entire system compact. Conversely, when $|f_2| \cdot (1/r_b - 1/r_a)$ increases beyond the upper limit of condition formula (5), the trend is such that an insufficient correction of spherical aberration results at the longest focal length setting, or the spherical aberration related to higher order of aberration coefficients is generated, with the result that the lens system may be useful only with the aperture stop sufficiently stopped down.

The condition formula (6) defines a condition for securing a back focal length necessary for a camera lens while keeping the entire system compact. Thus, when $d_m$ becomes greater then the upper limit of condition formula (6), it becomes difficult to secure such a back focal length. Conversely, when $d_m$ is decreased beyond the lower limit of condition formula (6), the distance from the surface of the relay lens group R which is nearest the object to the forward principal point of the relay lens group R tends to be greater and, consequently, the resultant lens system has to be great in overall lens length.

The condition formula (7) is a condition for balancing the spherical aberration of the entire system in a desirable condition and, at the same time, keeping the entire system compact. Thus, when $r_c/r_d$ becomes greater then the upper limit of condition formula (7), an insufficient correction of spherical aberration tends to result or a flare resulting from a considerable existance of a high order of spherical aberration coefficients is generated so that the lens system will be useful only with the aperture stop sufficiently stopped down. Conversely, when $r_c/r_d$ is diminished beyond the lower limit of condition formula (7), either an insufficient correction of spherical aberration tends to result or the resultant lens system will have to be great in overall lens length.

The condition formula (8) is a condition for balancing the chromatic aberrations of the entire system. If $\nu_l$ and $\nu_m$ are selected outside the condition, it becomes extremely difficult to correct for the lateral chromatic aberration of the entire system.

Finally, condition formula (9) means that the rear surface of the positive doublet element of the first sub-group $R_1$ in the relay lens group R should be relatively flat. In case the radius of curvature $r_e$ is of a positive value, the total length of the relay lens group R tends to be increased and the spherical aberration is excessively corrected when the rear surface has a curvature which does not fulfill the formula (9). In case the radius of curvature $r_e$ is of a negative value, the spherical aberration is insufficiently corrected if the condition formula (9) is not fulfilled.

The following tables 1 to 4 disclose respectively a first to a fourth embodiment of the present invention. In the tables, f equals the focal length, $\omega$ equals the field angle, r is the radius of curvature with the respective sub-numbers indicating the surfaces from the object to image side along the optical axis, d represents the axial distance and includes both the air spaces and the actual thickness of the optical elements along the optical axis. N equals the refractive index and again the sub-number refers to the particular optical element from the object to image side and finally, $\nu$ equals the Abbe number and the sub-numbers refer to the specific optical elements from the object to image side.

It should be noted that the first to the third embodiments are designed for use in 35 mm single lens reflex cameras, while the fourth embodiment is for so-called 110 size compact cameras.

Table 1

(Embodiment 1)

$f = 131.5 \sim 51.5$　　$F_{No.} = 3.6$　　$2\omega = 18° \sim 47°$

| | Radius of Curvature | | Axial Distance | Refractive Index | | Abbe Number |
|---|---|---|---|---|---|---|
| $G_1$ | $r_1$ | 86.86 | | | | |
| | | | $d_1$　1.7 | $N_1$　1.8052 | $\nu_1$ | 25.4 |
| | $r_2$ | 46.23 | | | | |
| $G_2$ | | | $d_2$　5.9 | $N_2$　1.67 | $\nu_2$ | 57.1 |
| | $r_3$ | 148.12 | | | | |
| | | | $d_3$　0.1 | | | |
| $G_3$ | $r_4$ | 70.02 | | | | |
| | | | $d_4$　4.6 | $N_3$　1.6783 | $\nu_3$ | 49.0 |
| | $r_5$ | 580.0 | | | | |
| | | | $d_5$　34.69 ~ 1.09 | | | |
| $G_4$ | $r_6$ | −683.8 | | | | |
| | | | $d_6$　1.3 | $N_4$　1.6968 | $\nu_4$ | 55.5 |
| | $r_7$ | 22.73 | | | | |
| | | | $d_7$　4.6 | | | |
| $G_5$ | $r_8$ | −268.06 | | | | |
| | | | $d_8$　1.2 | $N_5$　1.6583 | $\nu_5$ | 58.5 |
| | $r_9$ | 72.97 | | | | |
| | | | $d_9$　0.5 | | | |
| $G_6$ | $r_{10}$ | 33.01 | | | | |
| | | | $d_{10}$　3.0 | $N_6$　1.8052 | $\nu_6$ | 25.4 |
| | $r_{11}$ | 103.0 | | | | |
| | | | $d_{11}$　3.67 ~ 30.19 | | | |
| $G_7$ | $r_{12}$ | −43.55 | | | | |
| | | | $d_{12}$　1.2 | $N_7$　1.67 | $\nu_7$ | 57.1 |
| | $r_{13}$ | −104.04 | | | | |
| | | | $d_{13}$　2.5 ~ 9.57 | | | |
| $G_8$ | $r_{14}$ | 90.98 | | | | |
| | | | $d_{14}$　4.5 | $N_8$　1.6214 | $\nu_8$ | 61.3 |
| | $r_{15}$ | −54.03 | | | | |
| | | | $d_{15}$　0.1 | | | |
| | $r_{16}$ | 36.97 | | | | |

Table 1-continued (Embodiment 1)

$f = 131.5 \sim 51.5$  $F_{No.} = 3.6$  $2\omega = 18° \sim 47°$

| | Radius of Curvature | | Axial Distance | | Refractive Index | | Abbe Number | |
|---|---|---|---|---|---|---|---|---|
| $G_9$ | | | $d_{16}$ | 6.5 | $N_9$ | 1.5168 | $\nu_9$ | 64.0 |
| $G_{10}$ | $r_{17}$ | −45.15 | $d_{17}$ | 2.0 | $N_{10}$ | 1.8074 | $\nu_{10}$ | 31.6 |
| | $r_{18}$ | 375.3 | | | | | | |
| | | | $d_{18}$ | 27.5 | | | | |
| $G_{11}$ | $r_{19}$ | 295.8 | $d_{19}$ | 4.0 | $N_{11}$ | 1.6214 | $\nu_{11}$ | 61.3 |
| | $r_{20}$ | −48.74 | | | | | | |
| | | | $d_{20}$ | 7.05 | | | | |
| $G_{12}$ | $r_{21}$ | −24.41 | $d_{21}$ | 2.0 | $N_{12}$ | 1.67 | $\nu_{12}$ | 47.2 |
| | $r_{22}$ | −56.36 | | | | | | |

Table 2

(Embodiment 2)

$f = 131.5 \sim 51.0$  $F_{No.} = 3.6$  $2\omega = 18° \sim 47°$

| | Radius of Curvature | | Axial Distance | | Refractive Index | | Abbe Number | |
|---|---|---|---|---|---|---|---|---|
| $G_1$ | $r_1$ | 86.17 | $d_1$ | 3.6 | $N_1$ | 1.6583 | $\nu_1$ | 57.3 |
| | $r_2$ | 185.22 | | | | | | |
| | | | $d_2$ | 0.1 | | | | |
| $G_2$ | $r_3$ | 67.81 | $d_3$ | 1.7 | $N_2$ | 1.8052 | $\nu_2$ | 25.4 |
| $G_3$ | $r_4$ | 43.23 | $d_4$ | 7.6 | $N_3$ | 1.6228 | $\nu_3$ | 57.0 |
| | $r_5$ | 396.8 | | | | | | |
| | | | $d_5$ | 33.96~0.96 | | | | |
| $G_4$ | $r_6$ | −864.3 | $d_6$ | 1.3 | $N_4$ | 1.6935 | $\nu_4$ | 50.3 |
| | $r_7$ | 22.17 | | | | | | |
| | | | $d_7$ | 4.6 | | | | |
| $G_5$ | $r_8$ | −314.4 | $d_8$ | 1.2 | $N_5$ | 1.6583 | $\nu_5$ | 58.5 |
| | $r_9$ | 62.677 | | | | | | |
| | | | $d_9$ | 0.5 | | | | |
| $G_6$ | $r_{10}$ | 32.08 | $d_{10}$ | 3.05 | $N_6$ | 1.8052 | $\nu_6$ | 25.4 |
| | $r_{11}$ | 113.28 | | | | | | |
| | | | $d_{11}$ | 3.32~28.44 | | | | |
| $G_7$ | $r_{12}$ | −42.35 | $d_{12}$ | 1.2 | $N_7$ | 1.6204 | $\nu_7$ | 60.3 |
| | $r_{13}$ | −133.24 | | | | | | |
| | | | $d_{13}$ | 2.5~10.38 | | | | |
| $G_8$ | $r_{14}$ | 86.97 | $d_{14}$ | 4.5 | $N_8$ | 1.5168 | $\nu_8$ | 64.0 |
| | $r_{15}$ | −44.32 | | | | | | |
| | | | $d_{15}$ | 0.1 | | | | |
| $G_9$ | $r_{16}$ | 34.11 | $d_{16}$ | 6.5 | $N_9$ | 1.5168 | $\nu_9$ | 64.0 |
| | $r_{17}$ | −40.16 | | | | | | |
| $G_{10}$ | | | $d_{17}$ | 2.0 | $N_{10}$ | 1.8074 | $\nu_{10}$ | 31.6 |
| | $r_{18}$ | 679.8 | | | | | | |
| | | | $d_{18}$ | 26.5 | | | | |
| $G_{11}$ | $r_{19}$ | 293.2 | $d_{19}$ | 4.0 | $N_{11}$ | 1.6204 | $\nu_{11}$ | 60.3 |
| | $r_{20}$ | −45.88 | | | | | | |
| | | | $d_{20}$ | 6.96 | | | | |
| $G_{12}$ | $r_{21}$ | −23.67 | $d_{21}$ | 2.0 | $N_{12}$ | 1.671 | $\nu_{12}$ | 51.8 |
| | $r_{22}$ | −55.19 | | | | | | |

Table 3

(Embodiment 3)

$f = 131.5 \sim 51.5$  $F_{No.} = 3.6$  $2\omega = 18° \sim 47°$

| | Radius of Curvature | | Axial Distance | | Refractive Index | | Abbe Number | |
|---|---|---|---|---|---|---|---|---|
| $G_1$ | $r_1$ | 85.57 | $d_1$ | 1.7 | $N_1$ | 1.8052 | $\nu_1$ | 25.4 |

Table 3-continued
(Embodiment 3)

f = 131.5~51.5      F$_{No.}$ = 3.6      2ω = 18°~47°

| | | Radius of Curvature | | Axial Distance | | Refractive Index | | Abbe Number |
|---|---|---|---|---|---|---|---|---|
| G$_2$ | r$_2$ | 46.50 | d$_2$ | 5.9 | N$_2$ | 1.67 | ν$_2$ | 57.1 |
| | r$_3$ | 144.18 | d$_3$ | 0.1 | | | | |
| G$_3$ | r$_4$ | 69.13 | d$_4$ | 4.6 | N$_3$ | 1.6783 | ν$_3$ | 49.0 |
| | r$_5$ | 508.1 | d$_5$ | 34.6~1.0 | | | | |
| G$_4$ | r$_6$ | −696.6 | d$_6$ | 1.3 | N$_4$ | 1.6968 | ν$_4$ | 55.5 |
| | r$_7$ | 22.62 | d$_7$ | 4.6 | | | | |
| G$_5$ | r$_8$ | −276.75 | d$_8$ | 1.2 | N$_5$ | 1.6583 | ν$_5$ | 58.5 |
| | r$_9$ | 72.07 | d$_9$ | 0.5 | | | | |
| G$_6$ | r$_{10}$ | 32.88 | d$_{10}$ | 3.0 | N$_6$ | 1.8052 | ν$_6$ | 25.4 |
| | r$_{11}$ | 103.59 | d$_{11}$ | 4.2~30.73 | | | | |
| G$_7$ | r$_{12}$ | −43.85 | d$_{12}$ | 1.0 | N$_7$ | 1.6783 | ν$_7$ | 49.0 |
| G$_8$ | r$_{13}$ | −161.29 | d$_{13}$ | 1.5 | N$_8$ | 1.683 | ν$_8$ | 32.1 |
| | r$_{14}$ | −105.49 | d$_{14}$ | 2.5~9.57 | | | | |
| G$_9$ | r$_{15}$ | 88.54 | d$_{15}$ | 3.7 | N$_9$ | 1.6405 | ν$_9$ | 60.1 |
| | r$_{16}$ | −53.51 | d$_{16}$ | 0.1 | | | | |
| G$_{10}$ | r$_{17}$ | 37.18 | d$_{17}$ | 6.0 | N$_{10}$ | 1.5168 | ν$_{10}$ | 64.0 |
| | r$_{18}$ | −44.76 | | | | | | |
| G$_{11}$ | | | d$_{18}$ | 2.0 | N$_{11}$ | 1.8074 | ν$_{11}$ | 31.6 |
| | r$_{19}$ | 222.8 | d$_{19}$ | 27.15 | | | | |
| G$_{12}$ | r$_{20}$ | 217.8 | d$_{20}$ | 3.5 | N$_{12}$ | 1.5168 | ν$_{12}$ | 64.0 |
| | r$_{21}$ | −46.41 | d$_{21}$ | 8.4 | | | | |
| G$_{13}$ | r$_{22}$ | −23.57 | d$_{22}$ | 2.0 | N$_{13}$ | 1.5714 | ν$_{13}$ | 52.9 |
| | r$_{23}$ | −55.25 | | | | | | |

Table 4
(Embodiment 4)

f = 65.75~25.8      F$_{No.}$ = 3.6      2ω = 18°~47°

| | | Radius of Curvature | | Axial Distance | | Refractive Index | | Abbe Number |
|---|---|---|---|---|---|---|---|---|
| G$_1$ | r$_1$ | 43.96 | d$_1$ | 1.2 | N$_1$ | 1.8052 | ν$_1$ | 25.4 |
| | r$_2$ | 23.89 | | | | | | |
| G$_2$ | | | d$_2$ | 4.0 | N$_2$ | 1.67 | ν$_2$ | 57.1 |
| | r$_3$ | 77.57 | d$_3$ | 0.05 | | | | |
| G$_3$ | r$_4$ | 36.71 | d$_4$ | 3.0 | N$_3$ | 1.6783 | ν$_3$ | 49.0 |
| | r$_5$ | 233.83 | d$_5$ | 18.46~1.65 | | | | |
| G$_4$ | r$_6$ | −959.0 | d$_6$ | 0.85 | N$_4$ | 1.6968 | ν$_4$ | 55.5 |
| | r$_7$ | 11.38 | d$_7$ | 2.8 | | | | |
| G$_5$ | r$_8$ | −167.78 | d$_8$ | 0.8 | N$_5$ | 1.6583 | ν$_5$ | 58.5 |
| | r$_9$ | 32.71 | d$_9$ | 0.2 | | | | |
| G$_6$ | r$_{10}$ | 16.66 | d$_{10}$ | 2.5 | N$_6$ | 1.8052 | ν$_6$ | 25.4 |
| | r$_{11}$ | 52.76 | | | | | | |

Table 4-continued
(Embodiment 4)

$f = 65.75 \sim 25.8$  $F_{No.} = 3.6$  $2\omega = 18° \sim 47°$

| | Radius of Curvature | | Axial Distance | Refractive Index | | Abbe Number |
|---|---|---|---|---|---|---|
| | | $d_{11}$ | $2.02 \sim 15.71$ | | | |
| $G_7$ | $r_{12}$ $-23.44$ | $d_{12}$ | 0.85 | $N_7$ 1.67 | $\nu_7$ | 57.1 |
| | $r_{13}$ $-67.24$ | $d_{13}$ | $1.55 \sim 4.65$ | | | |
| $G_8$ | $r_{14}$ 45.0 | $d_{14}$ | 2.8 | $N_8$ 1.6214 | $\nu_8$ | 61.3 |
| | $r_{15}$ $-30.52$ | $d_{15}$ | 0.05 | | | |
| $G_9$ | $r_{16}$ 17.52 | $d_{16}$ | 3.75 | $N_9$ 1.5168 | $\nu_9$ | 64.0 |
| | $r_{17}$ $-22.58$ | | | | | |
| $G_{10}$ | | $d_{17}$ | 1.0 | $N_{10}$ 1.8074 | $\nu_{10}$ | 31.6 |
| | $r_{18}$ 136.35 | $d_{18}$ | 10.3 | | | |
| $G_{11}$ | $r_{19}$ 151.27 | $d_{19}$ | 2.3 | $N_{11}$ 1.6214 | $\nu_{11}$ | 61.3 |
| | $r_{20}$ $-21.71$ | $d_{20}$ | 3.85 | | | |
| $G_{12}$ | $r_{21}$ $-11.63$ | $d_{21}$ | 1.0 | $N_{12}$ 1.67 | $\nu_{12}$ | 47.2 |
| | $r_{22}$ $-25.55$ | | | | | |

Figure 1:
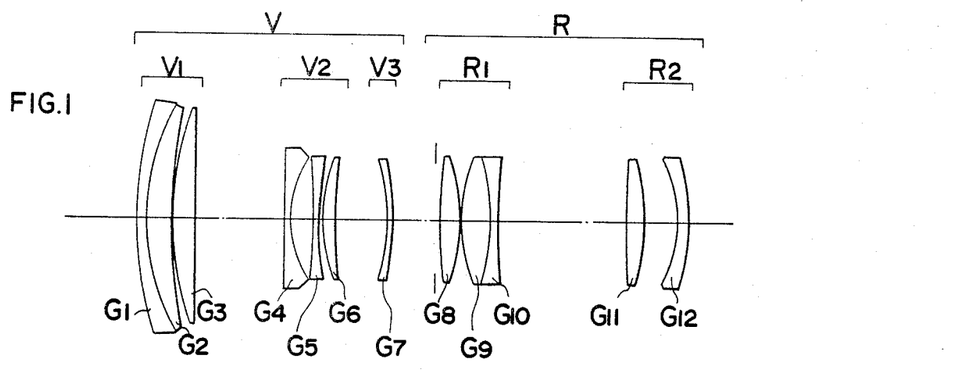
FIG. 1 is a schematic view of a first embodiment of the present invention.
Figure 2:
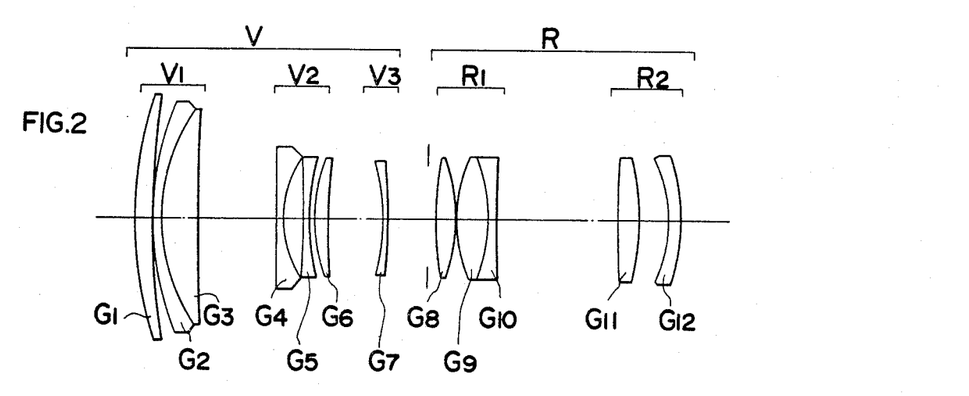
FIG. 2 is a schematic view of a second embodiment of the present invention.
Figure 3:
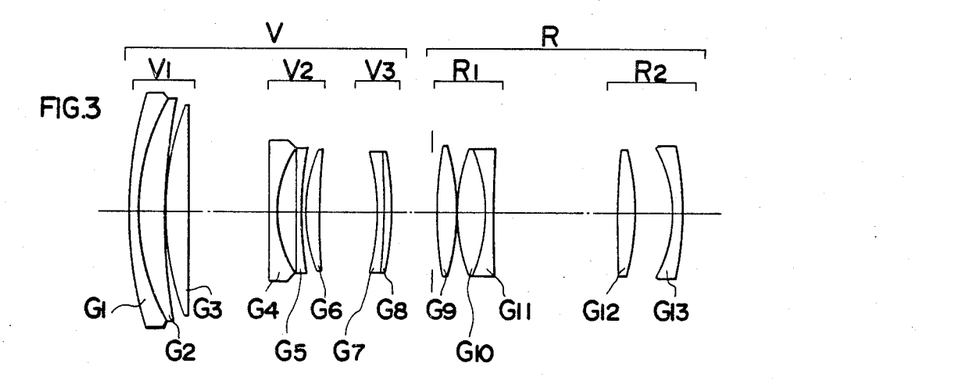
FIG. 3 is a schematic view of a third embodiment of the present invention.
Figure 4:
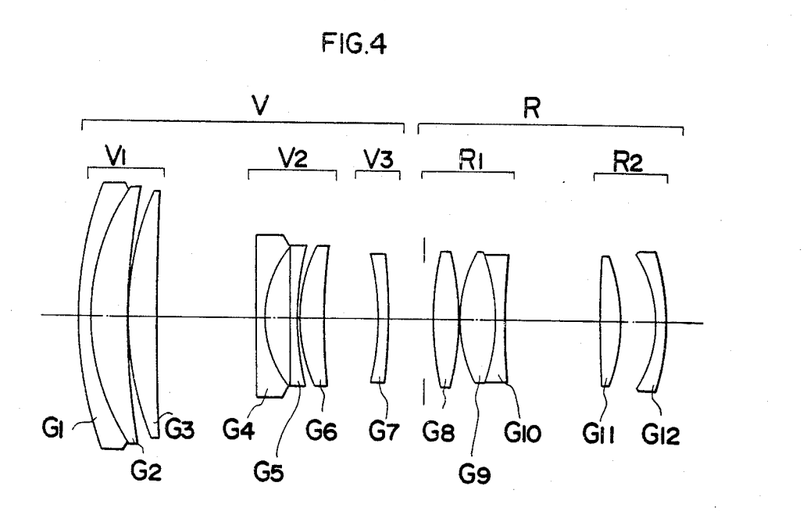
FIG. 4 is a schematic view of a fourth embodiment of the present invention.
Figure 5A:
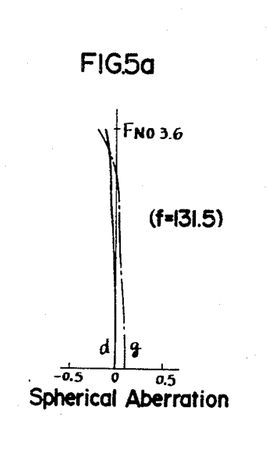
FIGS. 5a, 5b and 5c are graphical plots of various aberrations for f=131.5 of the first embodiment.
Figure 5B:
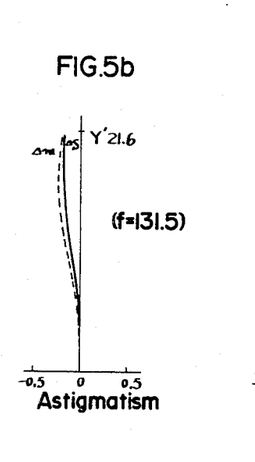
Figure 5C:
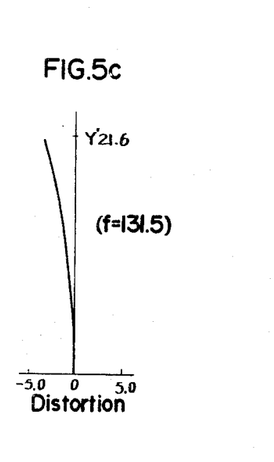
Figures 6A, 6B:
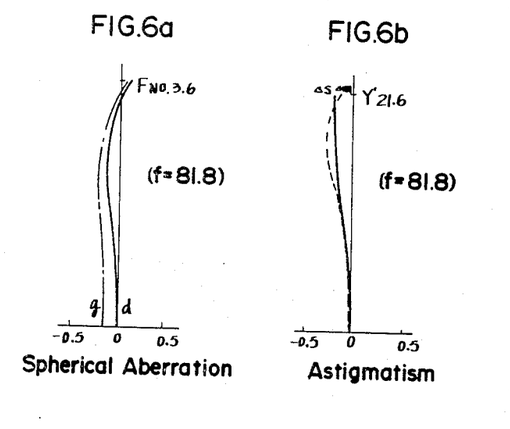
FIGS. 6a, 6b and 6c are graphical plots of various aberrations for f=81.8 of the first embodiment.
Figure 6C:
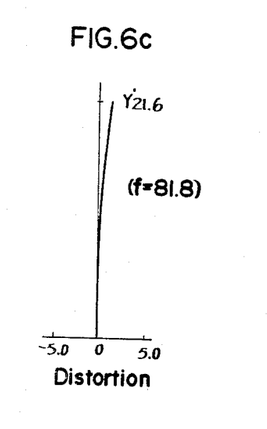
Figures 7A, 7B:
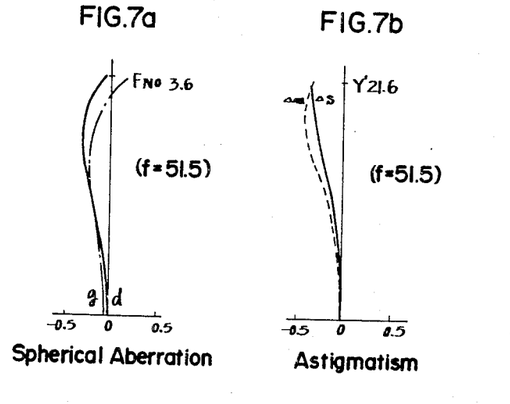
FIGS. 7a, 7b and 7c are graphical plots of various aberrations for f=51.5 of the first embodiment.
Figure 7C:
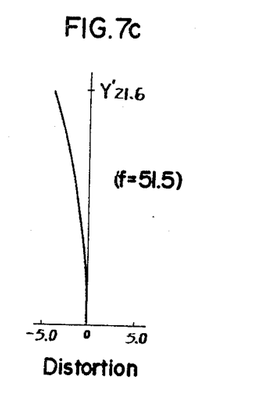
Figure 8A:
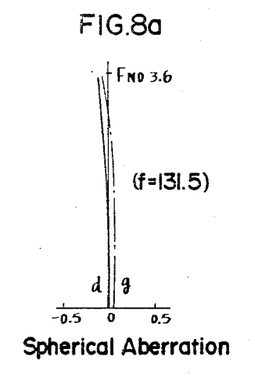
FIGS. 8a, 8b and 8c are graphical plots of various aberrations for f=131.5 of the second embodiment.
Figure 8B:
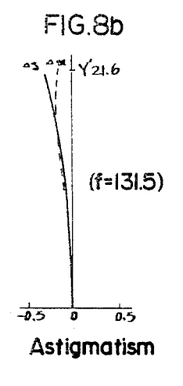
Figure 8C:
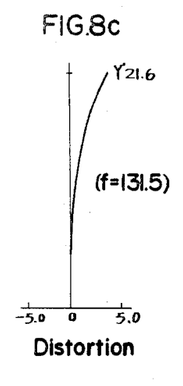
Figure 9A:
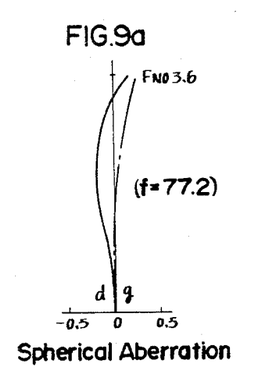
FIGS. 9a, 9b and 9c are graphical plots of various aberrations for f=77.7 of the second embodiment.
Figure 9B:
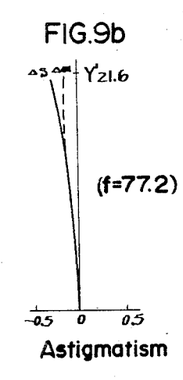
Figure 9C:
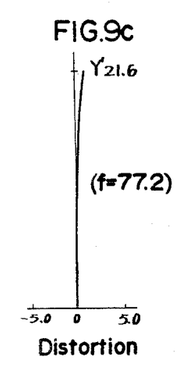
Figure 10A:
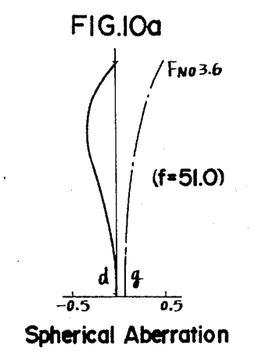
FIGS. 10a, 10b and 10c are graphical plots of various aberrations for f=51.0 of the second embodiment.
Figure 10B:
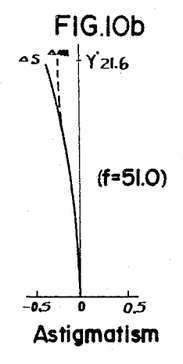
Figure 10C:
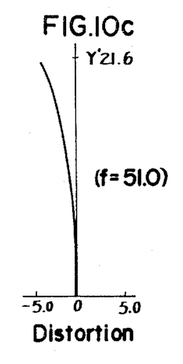
Figure 11A:
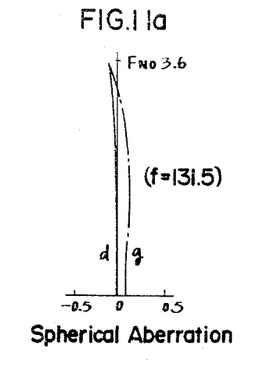
FIGS. 11a, 11b and 11c are graphical plots of various aberrations for f=131.5 of the third embodiment.
Figure 11B:
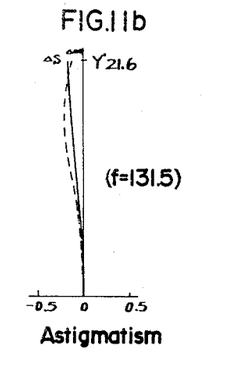
Figure 11C:
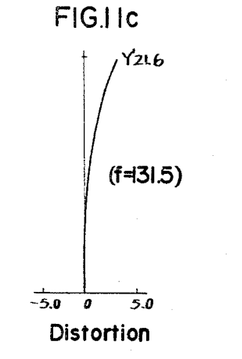
Figure 12A:
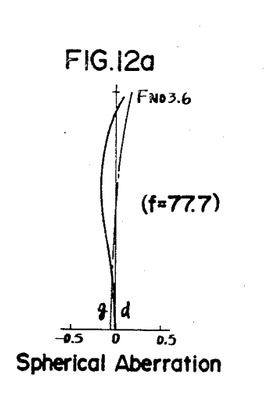
FIGS. 12a, 12b and 12c are graphical plots of various aberrations for f=77.7 of the third embodiment.
Figure 12B:
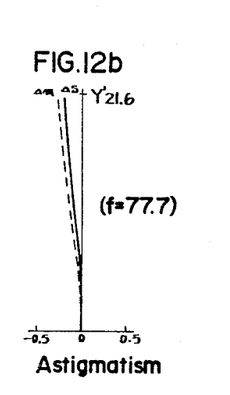
Figure 12C:
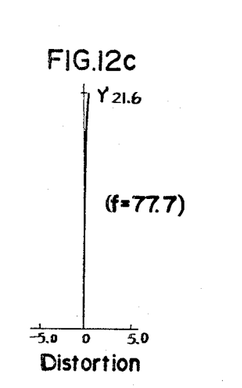
Figure 13A:
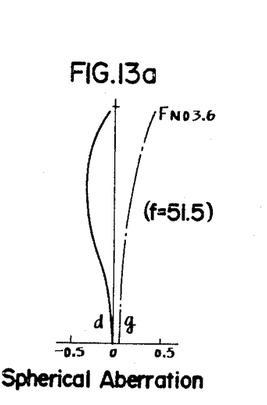
FIGS. 13a, 13b and 13c are graphical plots of various aberrations for f=51.5 of the third embodiment.
Figure 13B:
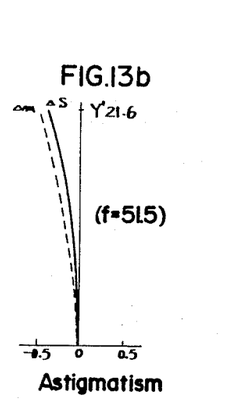
Figure 13C:
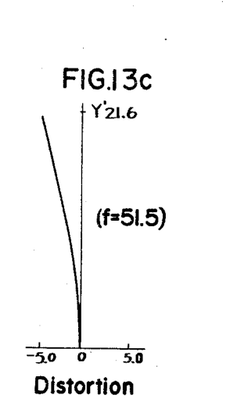
Figure 14A:
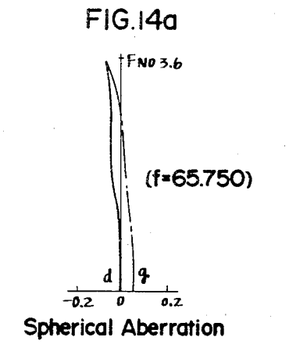
FIGS. 14a, 14b and 14c are graphical plots of various aberrations for f=65.750 of the fourth embodiment.
Figure 14B:
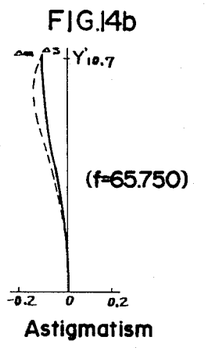
Figure 14C:
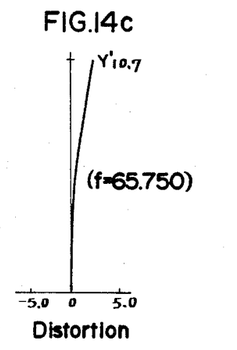
Figure 15A:
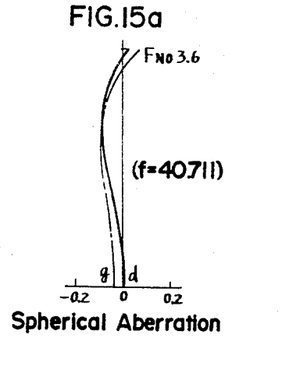
FIGS. 15a, 15b and 15c are graphical plots of various aberrations for f=40.711 of the fourth embodiment.
Figure 15B:
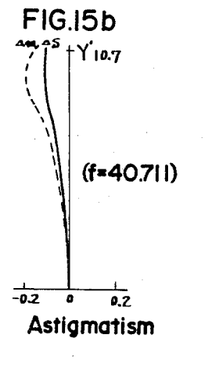
Figure 15C:
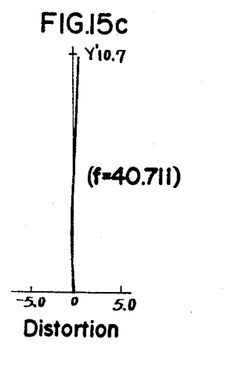
Figure 16A:
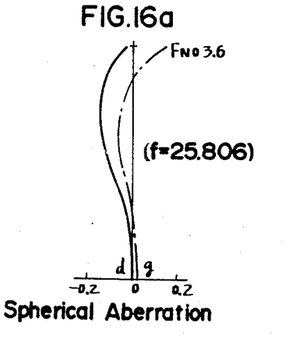
FIGS. 16a, 16b and 16c are graphical plots of various aberrations for f=25.806 of the fourth embodiment.
Figure 16B:
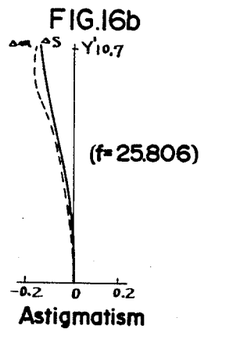
Figure 16C:
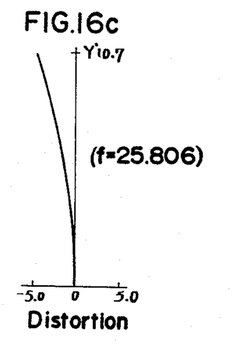

Referring to FIGS. 1 to 4, schematic views of the first to fourth embodiments of the present invention are shown, respectively. The respective graphical plots of the aberrations for the embodiment of FIG. 1 are disclosed in FIGS. 5, 6 and 7; for the embodiment of FIG. 2 in FIGS. 8, 9 and 10; for the embodiment of FIG. 3 in FIGS. 11, 12 and 13; and for the embodiment of FIG. 4 in FIGS. 14, 15 and 17, respectively.

As can be readily appreciated, it is possible to deviate from the above embodiments of the present invention and, as will be readily understood by those skilled in the optical art, the invention is capable of many modifications and improvements within the scope and spirit thereof. Accordingly, it will be understood that the invention is not to be limited by this specific enclosed embodiments but only by the scope and spirit of the appended claims.

What is claimed is:

1. A zoom lens system comprising:
a front lens group of a positive refractive power consisting of a positive single lens component and a positive doublet component formed by cementing negative and positive single lenses;
a variator lens group of a negative refractive power consisting of a first negative single lens component, a second negative single lens component at the image side of the first negative single lens component and a positive single lens component at the image side of the second negative single lens component, the second negative single lens component and the positive single lens component forming a negative meniscus shaped air space therebetween;
a compensator lens group of a negative refractive power consisting of one lens component; and
a relay lens group having a first sub-group and a second sub-group at the image side of the first sub-group, the first sub-group following the compensator lens group without any lens element interposed and consisting of a positive single lens component and a positive doublet component, while the rear sub-group consisting of a positive lens component and a negative single lens component at the image side of the positive lens component.

2. The invention of claim 1, wherein the image side surface of the second negative single lens component in the variator lens group and the object side surface of the positive single lens component in the variator lens group form an air space of a negative meniscus shape therebetween defined by the following condition formula:

$$0.1 < |f_2| \cdot (1/r_b - 1/r_a) < 1.0$$

wherein:
$f_2$ represents the focal length of the variator lens group;
$r_a$ represents the radius of curvature of the image side surface of the second negative single lens component in the variator lens group; and
$r_b$ represents the radius of curvature of the object side surface of the positive single lens component in the variator lens group.

3. The invention of claim 2, wherein the absolute value of the radius of curvature of the rear surface is less than that of the front surface in each of the first and second negative single lens components of the variator lens group, while the positive single lens component of the variator lens group is a positive meniscus lens convex to the object side.

4. The invention of claim 2, wherein the first sub-group and the second sub-group of the relay lens group form a relatively wide air space therebetween defined by the following condition formula:

$$1.3 f_m > d_m > 0.25 f_m$$

wherein:
$f_m$ represents the focal length of the relay lens group; and
$d_m$ represents the distance between the first and second sub-groups of the relay lens group.

5. The invention of claim 4 further fulfils the following equation formula:

$$0 < \nu_l - \nu_m < 30$$

wherein:

$\nu_c$ represents the Abbe number of the positive lens component of the second sub-group in the relay lens group; and $\nu_m$ represents the Abbe number of the negative single lens component of the second sub-group in the relay lens group.

6. The invention of claim 4, wherein the focal length $f_2$ of the variator lens group fulfils the following condition formula:

$$f_s > |f_2| > 0.5 f_s$$

wherein:

$f_s$ represents the focal length of the whole zoom lens system at the shortest focal length setting.

7. The invention of claim 14, wherein the absolute value of the radius of curvature of the rear surface is less than that of the front surface in the positive lens component of the second sub-group of the relay lens group, while the negative single lens component of the second sub-group of the relay lens group is a negative meniscus lens convex to the image side.

8. The invention of claim 1, wherein the positive doublet component is located at the object side of the positive single lens component in the front lens group.

9. The invention of claim 1, wherein the positive single lens component is located at the object side of the positive doublet component in the front lens group.

10. The invention of claim 1, wherein the lens component of the compensator lens group is a negative meniscus single lens component convex to the image side.

11. The invention of claim 1, wherein the lens component of the compensator lens group is a negative meniscus doublet component convex to the image side.

12. The invention of claim 1, wherein the positive single lens component is located at the object side of the positive doublet component in the first sub-group of the relay lens group and the positive lens component of the second sub-group in the relay lens group is a single lens component.

13. The invention of claim 4, wherein the positive doublet component of the first sub-group in the relay lens group is located at the image side of the positive single lens component of the first sub-group.

14. The invention of claim 6 further fulfills the following condition formula:

$$5.0 > r_c/r_d > 1.3$$

$$0 < \nu_l - \nu_m < 30$$

wherein:

$r_c$ represents the radius of curvature of the image side surface of the positive lens component of the second sub-group in the relay lens group;

$r_d$ represents the radius of curvature of the object side surface of the negative single lens component of the second sub-group in the relay lens group;

$\nu_l$ represents the Abbe number of the positive lens component of the second sub-group in the relay lens group; and $\nu_m$ represents the Abbe number of the negative single lens component of the second sub-group in the relay lens group.

* * * * *